United States Patent [19]

Tsay

[11] 3,935,522
[45] Jan. 27, 1976

[54] CONTROL DEVICE FOR THE ELECTRIC FAN

[76] Inventor: Peter Wen-Tien Tsay, No. 3, Hsin-Sheng South Road Section 1, Taipei, China /Taiwan

[22] Filed: Jan. 8, 1974

[21] Appl. No.: 431,765

[52] U.S. Cl. ............... 318/345; 318/285; 318/284; 318/283; 318/306
[51] Int. Cl.² .......................................... H07P 5/16
[58] Field of Search ........... 318/285, 284, 345, 283, 318/306

[56] References Cited
UNITED STATES PATENTS

| | | | |
|---|---|---|---|
| 3,566,228 | 2/1971 | Tsergas | 318/284 |
| 3,613,391 | 10/1971 | Harter | 318/345 |
| 3,629,615 | 12/1971 | Gurwicz | 318/345 |
| 3,742,337 | 6/1973 | Digneffe | 318/345 |
| 3,757,184 | 9/1973 | Chute | 318/345 |

*Primary Examiner*—James R. Scott
*Assistant Examiner*—John J. Feldhaus
*Attorney, Agent, or Firm*—Shoemaker and Mattare

[57] ABSTRACT

A control device for an electric fan comprising a power supply, a control means, a trigger pulse generator and a switch means, all connected in circuit with the motor of the electric fan, wherein the trigger pulse output of said trigger pulse generator is connected to trigger said switch means and is controlled through said control means to thereby achieve a stepless, variable speed control for the electric fan. Other forms of the device may further comprise a delay means, and/or delay reverse means, and/or wave generator means and/or any combination thereof, connected in the above circuit to accomplish stepless speed reduction and/or delay speed-down reverse and/or various kinds of imitative natural wind rotational speeds for the electric fan.

27 Claims, 14 Drawing Figures

CONTROL DEVICE FOR THE ELECTRIC FAN

BACKGROUND OF THE INVENTION

In the prior art, the controlling device for an electric fan has long been a variable reactor having a plurality of taps in series with the main winding of the electric fan motor. The speed reduction of the electric fan is obtained by selecting one of said taps step by step thrugh a switch. With this type of controlling means, the disadvantage results in that when the reduction speed of the electric fan is made by lowering the voltage applied to the electric fan through the action of said reactor, the efficiency of the electric fan is greatly decreased and a lot of heat is thus dissipated. The circuit connected in series with said reactor also reduces the power factor. Moreover, extremely low speed rotation could not be obtained through the control of such a device.

Though stepless, variable speed has been recently proposed in which a TRIAC or SCR is used as a switch means, stepless, variable speed is achieved by controlling the trigger retarding angle of a trigger pulse generator. This is merely making the change from step by step to stepless speed reduction. It does not make any contribution to the user. Furthermore, a phase control circuit of this type of controlling device for the electric fan is directly connected to the line voltage of commercial power supply and thus there is a likelihood of burning out some components thereof.

Another prior art type of speed recution device for an electric fan is a single-stage timer; in other words, the electric fan rotates at a predetermined speed for a period of time and then changes to a breezy speed of rotation. This aims to prevent people from catching cold after having gone to sleep with the fan on, especially weak or unhealthy people or babies. In any event, this type of controlling device does not meet the requirements of people. Another type of speed reduction device utilizes a multi-step timer. According to this type of controlling device, a timer switch from a first speed to a second speed, is divided into three stages, and the operational time period of each stage is fixed by manufacturers in advance so that the user cannot make any time period adjustment. Therefore, it still could not satisfy the requirement to enable people to meet any circumstance at any occasion.

In addition, the adjusting mechanism of the controlling device mentioned above easily gets out of order, is very large and heavy, and is costly and requires considerable maintenance.

Therefore, the object of the present invention is to provide an improved controlling device for an electric fan, wherein the speed reduction is gradually changed such that there is almost no awareness of speed variation during operation, and also speed reduction can efficiently be achieved to as low as 100 RPM.

Another object of the present invention is to provide an improved controlling device for the electric fan wherein the rotational speed variation is achieved by a stepless-delay-speed reduction to a predetermined value, and then reverse rotation with a sufficient speed to effect desired ventilation.

A further object of the present invention is to provide an improved controlling device wherein the speed adjustment of the electric fan is accomplished by generating a regular or irregular waveform to control said electric fan thereby producing with said fan an imitation of a natural breeze to make people feel more comfortable.

A still further object of the present invention is to provide a compact, low-cost, reliable, durable, lightweight, and semi-permanent, trouble-free solid state device.

SUMMARY OF THE INVENTION

The present invention relates to a control device for an electric fan in general, and more particularly, to an improved control device for obtaining a stepless, variable speed, a stepless delay speed reduction, a delay speed-down reverse, and an imitation of natural wind operations for the electric fan.

Still more particularly, in accordance with the present invention a motor speed control circuit is provided for an electric fan motor to control the speed of operation of the fan motor and the circuit includes a power supply means, and a delay speed reduction means including a charge-discharge circuit is connected to the power supply means and a first switch means is connected therewith to enable charging of the charge-discharge circuit when the first switch means is on, and to enable discharge of the charge-discharge circuit when the first switch means is off. Also, control means and trigger pulse generator means are connected in the circuit and the control means is arranged to control trigger pulses generated from the trigger pulse generator means, whereby stepless, variable speed control of the fan motor is accomplished. A resistor is connected in series between the power supply means and the trigger pulse generator means, and a second switch means is connected in parallel with the resistor. An output switch means is connected between the trigger pulse generator means and the fan motor to control power supply to the fan motor. Thus, when the first switch means is off and the second switch means is on, the circuit is operable to reduce the fan motor speed to a breezy speed operation, and when both said first and second switch means are off, the circuit is operable to reduce the fan motor speed to zero.

According to a first form of the present invention, the control device essentially comprises a power supply, a control means, a trigger pulse generator and a switch means all connected in circuit with the fan motor to produce a stepless, variable speed. According to other forms of the invention, the control device of the present invention comprises a power supply, control means, trigger pulse generator, switch means, and/or delay speed reduction circuit, and/or delay reverse circuit, and/or wave generator means, and their combinations to achieve an operation of stepless, variable speed, and/or stepless delay speed reduction, and/or imitation of natural wind operations for the electric fan.

DESCRIPTION OF THE INVENTION

Figure 1:
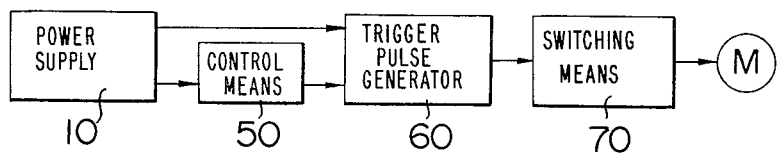
FIG. 1 shows a block diagram of the first embodiment of the present invention.
Figure 9:
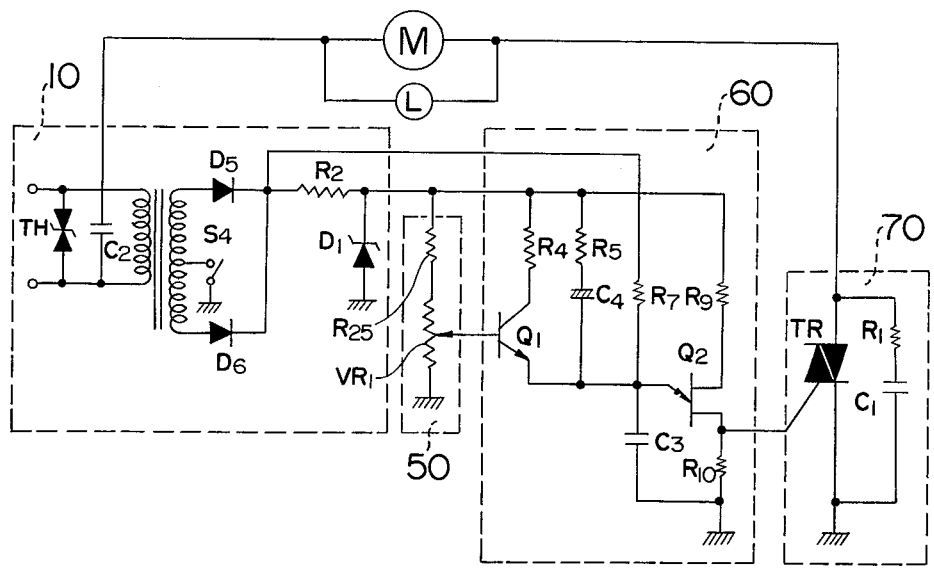
FIG. 9 shows a typical embodiment of circuit diagram of FIG. 1.

Referring to FIG. 1, a first form of the control device of the present invention comprises a power supply 10, control means 50, trigger pulse generator 60 and output switch means 70. In this embodiment, as seen in FIG. 9, control means 50 comprises a variable resistor $VR_1$ which is provided to control the pulse generated from said trigger pulse generator 60 which triggers said switch means 70 to thereby accomplish the stepless, variable speed for the electric fan M.

Said switch means 70 may be a thyristor, serving as a phase control means. For example, each interface of positive and negative half cycles of A.C. current, say zero value current, will turn said thyristor off. In order to trigger each half cycle with the same phase angle, the gate of said thyristor has to have applied thereto a trigger signal with the same trigger phase angle during each half cycle. After being triggered, said thyristor will not turn off until the current value comes down to zero. That is to say, said thyristor only turns off at the rest period of said half cycle after triggering. The triggering phase angle before conduction is called a trigger angle or trigger retardation angle. The conduction time interval of the thyristor is called a conducting angle. In particular, a preceding pulse, namely a relatively smaller trigger angle pulse will result in a high effective value of voltage being applied to its load and vice versa, thus called a phase control. It means that the rotational speed of the electric fan can be readily controlled through the control of the trigger retardation angle of the output trigger pulse from the trigger pulse generator.

Therefore, stepless, variable speed control of the electric fan according to the present invention is achieved by controlling the trigger retardation angle of the pulse output from the trigger pulse generator through the control means, which comprises a variable resistor or which may be a plurality of fixed resistors of multi-steps or the like. Further the outputs of the natural wind controlling means 90 and the delay speed reduction controlling means 30 are applied to the trigger generator to control the trigger pulse and therefore the speed of the electric fan.

According to the purpose of the present invention, the voltage applied to said trigger pulse generator 60 is reduced to a low voltage level by said power supply 10. Said pulse generator includes a high gain device with an amplifying means. Also, control means 50 controls said switch means 70 through amplifying transistor $Q_1$ so that the power dissipated by the variable resistor $VR_1$ of control means 50 can be reduced to a minimized extent and no components of the control means or the trigger pulse generator will be damaged.

Figure 2:
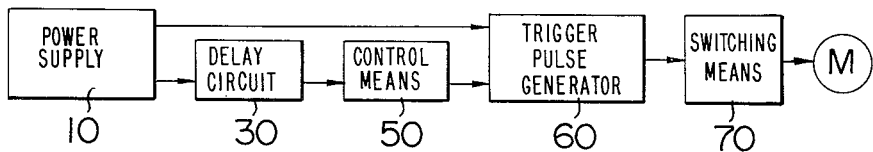
FIG. 2 shows a block diagram of the second embodiment of the present invention.

According to the second embodiment of the present invention, delay speed-reduction circuit 30 may be combined into the system mentioned above as shown in FIG. 2 to enable the electric fan to perform a stepless delay speed-reduction until zero speed when S3 and S1 are open or to produce a breezy speed operation depending on the closing of the breeze switch S1 with S3 open in addition to stepless, variable speed-reduction for an electric fan.

Figure 3:
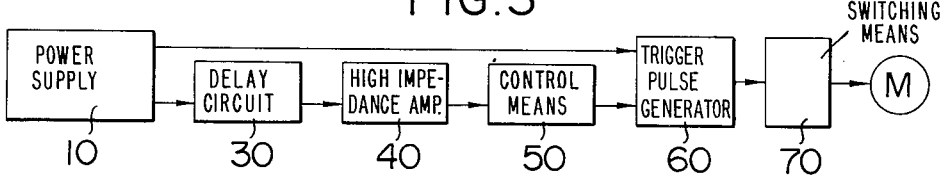
FIG. 3 shows a block diagram of the third embodiment of the present invention.

In FIG. 3, the third embodiment of control device is shown. In this embodiment, a high input impedance or high sensitivity amplifying means 40 is provided between said delay circuit 30 and control means 50 to provide a further time delay of speed reduction for the electric fan.

Figure 4:
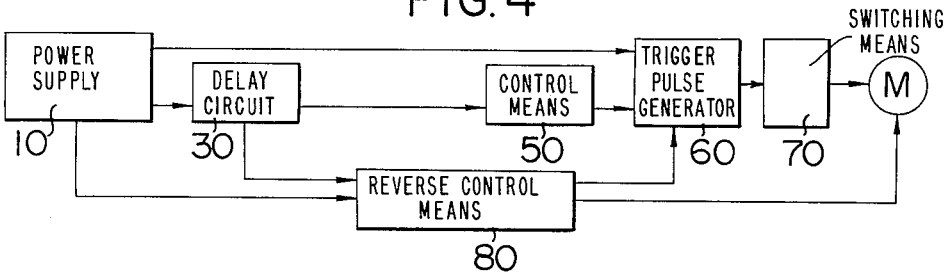
FIG. 4 shows a block diagram of the fourth embodiment of the present invention.

To obtain effectiveness of ventilation or wind reflection from a wall of the room for the electric fan during the time when a person using the fan is asleep, or to prevent people using the fan from becoming chilled and possibly catching a cold or the like, the fourth embodiment of the present invention includes a delay-reverse rotation circuit 80 which is not operated until the rotational speed of the fan reduces to a predetermined speed. The amplifying means 40 is omitted, as shown in FIG. 4. Speed reduction and reverse control means 80 is provided for reverse rotation of the electric fan.

Figure 5:
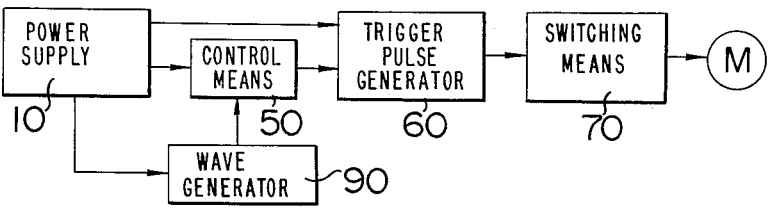
FIG. 5 shows a block diagram of the fifth embodiment of the present invention.

As shown in FIG. 5, wave generator 90 is combined into the system of the first embodiment shown in FIG. 1. Said wave generator 90 may be at least one kind of signal generator to produce regular or irregular, very low frequency waves to control speed variation of the fan to provide various kinds of imitative natural winds.

Figure 6:
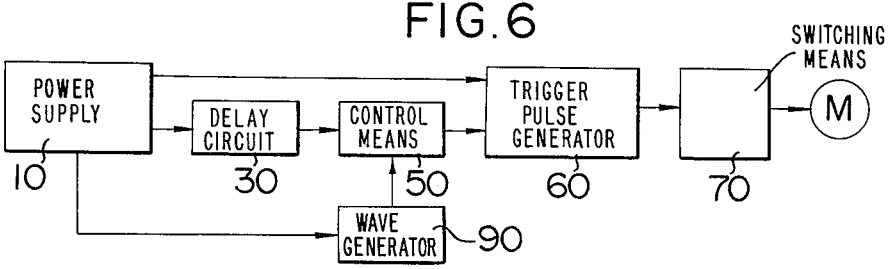
FIG. 6 shows a block diagram of the sixth embodiment of the present invention.

In the sixth embodiment, FIG. 6, said delay circuit 30 is further combined into the circuit of FIG. 5 to provide the electric fan with either delay speed-reduction or imitative natural wind capabilities.

Figure 7:
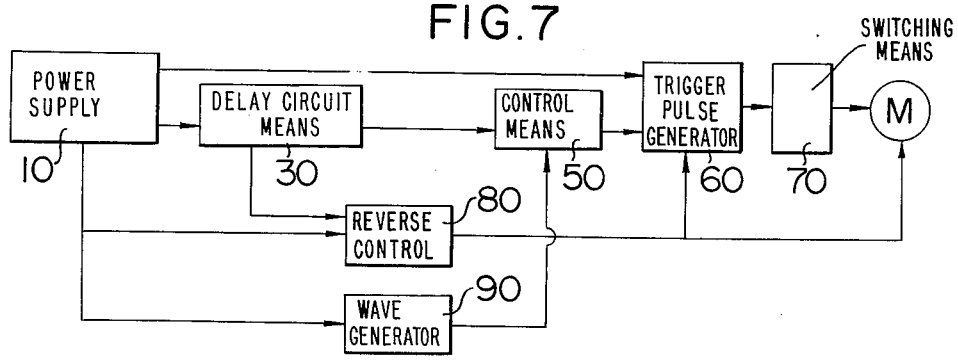
FIG. 7 shows a block diagram of the seventh embodiment of the present invention.

In a similar manner, wave generator 90 may also be combined into the system shown in the aforesaid fourth embodiment, as shown in FIG. 7.

Figure 8:
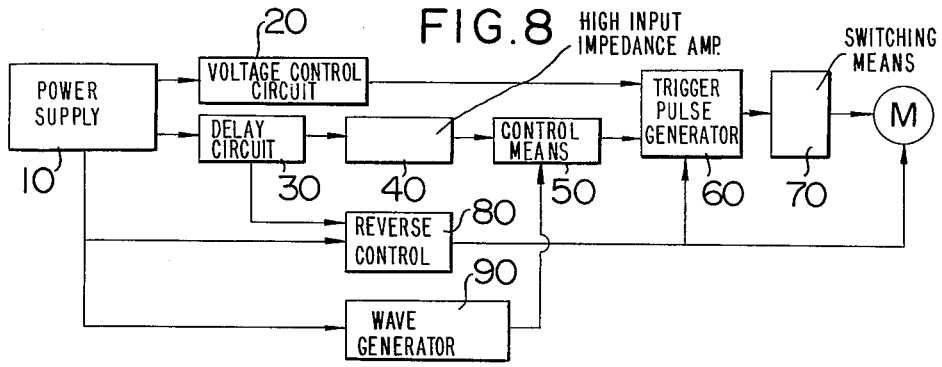
FIG. 8 shows a block diagram of the eighth embodiment of the present invention.

In addition, line voltage compensation circuit 20 may also be combined into the system described above as illustrated in FIG. 8, to prevent the trigger pulse generator 60 from becoming unstable and to thereby prevent the rotational speed of the fan from increasing and decreasing due to variations of line voltage.

A detailed description of the present invention will be discussed with reference to FIG. 10. In the drawing, the power supply 10 includes a power transformer $T_1$, diodes $D_2$, $D_5$, $D_6$, condenser $C_2$ and resistor $R_2$. Line voltage compensation circuit 20 includes resistor $R_3$, zener diode $D_1$ and condenser $C_5$ for supplying a compensating voltage output to the trigger pulse generator 60, to prevent the rotational speed of the electric fan from being changed in response to voltage variations from the power supply. With this arrangement, the line voltage is reduced to a low voltage and this low voltage is further kept at a constant level by zener diode $D_1$ so that the components of the trigger pulse generator can thus be protected. The motor of the electric fan used in the present invention may be a split-phase motor, commutating motor or shaded-pole type motor.

Figure 10:
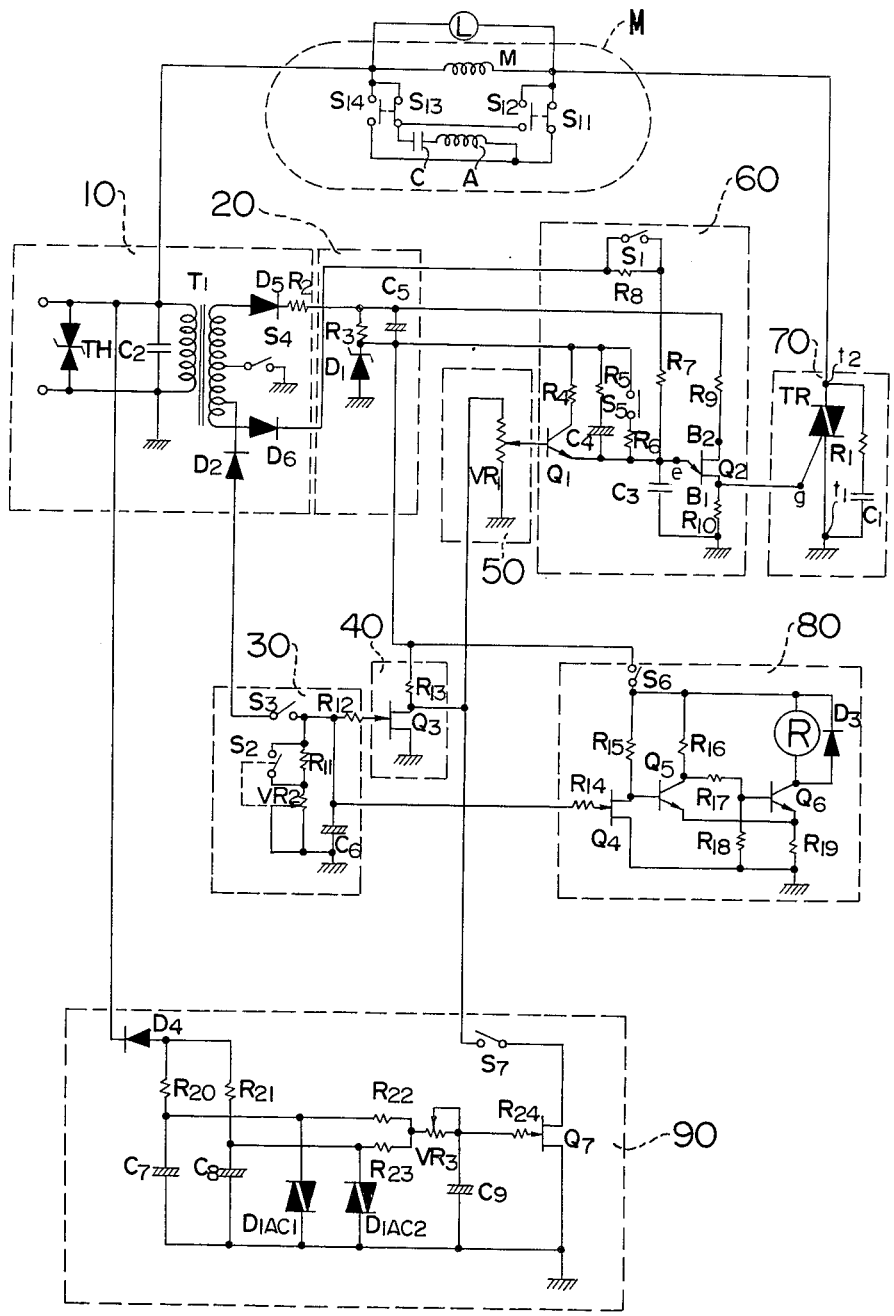
FIG. 10 shows a circuit diagram of FIG. 8.

In the case where a split-phase motor is used, as illustrated in FIG. 10, the motor includes a main winding M and an auxiliary winding A with starting capacitor C, wherein winding A can be switched into the motor circuit by either pairs of contacts $S_{11}$ and $S_{13}$ or $S_{12}$ and $S_{14}$ of relay R provided in delay reverse circuit 80, through which the directional rotation of the electric fan can be selected as desired. It will be understood that said contacts may be replaced by a static switching device, such as a TRIAC or SCR. Indicating means L i.e. a lamp, is shown connected across two terminals of the electric fan motor for indicating the rotational speed of the motor.

The output switch means 70 comprises a TRIAC having main terminals $t_1$ and $t_2$ and gate $g$ wherein gate $g$ is connected to output terminal of trigger pulse generator 60. Resistor $R_1$ and condenser $C_1$ are connected across terminals $t_2$ and $t_1$ to serve as a suppressor circuit to enable said TRIAC to be commutated due to the reactant load of the motor. It is to be understood that said TRIAC may be substituted by a SSS (Silicon Symmetrical Switch), SCR or any equivalent device.

The trigger pulse generator 60 comprises resistors $R_4$, $R_5$, $R_6$, $R_7$, $R_8$, $R_9$ and $R_{10}$, condensers $C_3$ and $C_4$, transistor $Q_1$ and UJT (Unijunction Transistor) $Q_2$. One terminal $B_2$ of UJT $Q_2$ is connected to power supply 10 through resistor $R_9$ and terminal $B_1$ is connected to resistor $R_{10}$ with the other end of the resistor $R_{10}$ being grounded. When the voltage level of condenser $C_3$ equals $V_{B1B2}$, UJT $Q_2$ will be triggered into a conducting state from terminals $e$ to $B_1$. In this manner, condenser $C_3$ discharges through resistor $R_{10}$ in a very short time interval due to the low resistance value of $R_{10}$, and therefore, a trigger signal is obtained from resistor $R_{10}$. In some particular instances, said resistor $R_{10}$ may be omitted and replaced by the equivalent resistance of the gate terminal of the thyristor. The charging circuits for condenser $C_3$ are as follows: (1) power supply $\rightarrow \frac{R8}{S1} \rightarrow R_7$; (2) power supply $\rightarrow R_4 \rightarrow Q_1$; (3) power supply $\rightarrow R_5 \rightarrow C_4$; and (4) power supply $\rightarrow S_5 \rightarrow R_6$. The charging circuit through resistors $R_7$, $R_8$ and switch $S_1$ results in condenser $C_3$ being supplied a gradually rising voltage waveform called a ramp wave component while the circuit charges through resistor $R_4$ and transistor $Q_1$; wherein the charging voltage across said condenser $C_3$ could not further increase to a predetermined level because the base of the transistor $Q_1$ is controlled by the signal output from control means 50. Also, the resistance value of $R_4$ is small and one end of the resistor $R_4$ is connected to the output terminal of zener diode $D_1$ to receive a clamped half sine wave of voltage. Thus, condenser $C_3$ is charged with a pedestal wave of voltage. In other words, controlling the trigger angle or changing the rotation speed of the fan is readily accomplished by controlling either said ramp wave or said pedestal wave.

Resistor $R_8$ is also utilized in conjunction with switch $S_1$ for controlling a breezy speed of the electric fan. If switch $S_1$ is opened when $S_3$ is open, the fan will speed-down until it comes to a complete stop. If switch $S_1$ is closed and $S_3$ is open, resistor $R_8$ is in short circuit, and the fan will speed-down to a breezy speed operation without going to a complete stop, although at the end of the delay speed reduction cycle, said pedestal wave component has decreased to zero due to the complete discharge of condenser $C_3$; however, the ramp wave could still exist. Closing said switch $S_1$ to short circuit resistor $R_8$ will further maintain a suitable value of ramp component of said ramp wave to thereby provide a breeze speed operation for the electric fan as long as desired.

The combination of resistor $R_5$ and condenser $C_4$ affords an enhancement of starting for electric fans. This is for the reason that there is only a relatively lower effective value of voltage applied to the electric fan under low-speed operation. During that time, small starting torque is incapable of being used to start the electric fan which can easily damage the thyrister or windings of the motor fan.

The combination of condenser $C_4$ and resistor $R_5$ is used to enable UJT $Q_2$ to be triggered earlier by the charging circuit of condenser $C_4$ at the beginning of the closing of the power switch $S_4$. In other words, the earlier the trigger action, the higher the starting voltage or starting torque applied to the electric fan.

The charging circuit of resistor $R_6$ and contact $S_5$ is provided to aid speed-down and reverse rotating operation, because the electric fan in delay speed-down to a sufficient low range of speed is considered of no use for reverse rotation; that is to say, such low speed of rotation does not contribute to the effectiveness of ventilation. Under this circumstance, additional contact $S_5$, controlled by the operation of relay R provided in delay reverse circuit 80, connected in series with resistor $R_6$, are therefore required to be connected into the delay reverse circuit to effect a sufficient high speed of rotation for the electric fan so that substantial ventilation may thus be obtained.

Figure 11:
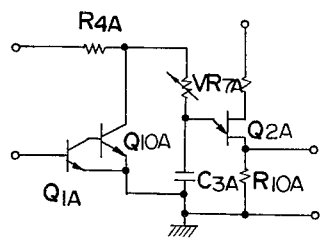
FIG. 11 shows another embodiment of trigger pulse generator of the present invention.
Figure 12:
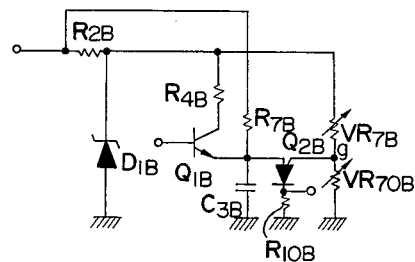
FIG. 12 shows further embodiment of trigger pulse generator of the present invention.
Figure 13:
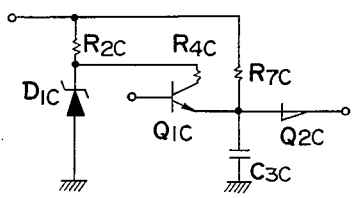
FIG. 13 shows a still further embodiment of trigger pulse generator of the present invention.

Other embodiments of trigger pulse generator 60 are shown in FIGS. 11, 12 and 13, wherein the corresponding element or component with respect to the last embodiment of FIG. 10 is designated with the same number but followed with A, B or C to distinguish therefrom.

In FIG. 11, the circuit producing a pedestal wave component is omitted, and only the ramp wave components are shown. This circuit may also be applicable to preset said pedestal wave as a constant component. In this way, a signal is applied to the base of transistor $Q_{1A}$, and the voltage output from resistor $VR_{7A}$ and condenser $C_{3A}$ can be controlled to trigger UJT $Q_{2A}$.

In FIG. 12, the active element of trigger pulse generator 60 is replaced by PUT $Q_{2B}$. The trigger voltage of PUT $Q_{2B}$ at point "g" depends on the proportional resistance value of $VR_{7B}$ and $VR_{70B}$. In such a way, the trigger retarding angle of the output trigger pulse could be controlled by changing the resistance values of resistors $R_{7B}$ or $R_{70B}$.

In FIG. 13, the active element of trigger pulse generator 60 is further substituted by SUS $Q_{2C}$. Similarly, other equivalent active elements such as a SBS, DIAC, and SCS consisting of two transistors may be used.

Delay speed reduction circuit 30, as shown in the drawing of FIG. 10, comprises switches $S_3$ and $S_2$, resistors $R_{11}$, $R_{12}$, variable resistor $VR_2$, and condenser $C_6$. If switch $S_3$ is closed, condenser $C_6$ is charged to a full value of voltage; and when $S_3$ is opened, said condenser $C_6$ is discharged through the circuit of $R_{11} \rightarrow S_2 \rightarrow VR_2$. Adjusting the value of variable resistor $VR_2$ changes the delay time. When the adjustment of variable resistor $VR_2$ is at its maximum extent and the mechanically operative switch $S_2$ is opened, the high resistance value of resistor $R_{11}$ is then connected in series with variable resistor $VR_2$ to obtain the longest delay time of discharging for condenser $C_6$. If resistor $R_{11}$ is omitted from the circuit, the discharging circuit is opened, said condenser $C_6$ can also be discharged through its leakage, resistance thereby obtaining a much longer time of delay. It will be noted that the charging voltage of the abovementioned circuit is negative through diode $D_2$, and the positive voltage may also be applicable if the other circuit is used.

Switch $S_4$ is an instant stop switch and is also used as a power switch for the circuit. If delay speed reduction is no longer required, switch $S_4$ can be switched off, wherein all power supply to the control circuit 30 is thus cut off. This switch $S_4$ may also be provided at the main circuit of electric fan M and the thyristor 70.

Speed reduction and reverse rotation circuit 80 as shown in the drawing, comprises an N-channel FET $Q_4$ of high input impedance controlling a known Schmitt trigger circuit including transistors $Q_5$ and $Q_6$. At the time the condenser $C_6$ is gradually discharging, and the speed of the electric fan is also gradually reducing, the output of FET $Q_4$ is decreasing to a predetermined level, said Schmitt trigger circuit is then triggered; hence, the output terminal of said Schmitt trigger, connected to relay R together with diode $D_3$, switches the terminals of auxiliary winding A through contacts $S_{11}$, $S_{12}$, $S_{13}$ and $S_{14}$ with respect to main winding M depending on the desired rotational direction of the electric fan. It is to be understood that said driving stage of input transistor $Q_4$ may be changed with MOSFET or CSCR (PUT).

Referring to the wave generator 90, there are two pairs of extremely low, discrete frequency relaxation oscillators comprising resistor $R_{20}$, condenser $C_7$ $DIAC_1$ and resistor $R_{21}$, condenser $C_8$, $DIAC_2$, and the isolation resistors $R_{22}$ and $R_{23}$. The resultant wave from both oscillators is applies to high input impedance transistor $Q_7$ through variable resistor $VR_3$, resistor $R_{24}$ and condenser $C_9$. Condenser $C_9$ may be used to adjust the amplitude of said resultant wave. Because of the different frequencies of said two pairs of relaxation oscillators, said resultant wave will be an irregular wave to control the rotational speed of the electric fan through FET $Q_7$, switch $S_7$, $VR_3$ and trigger generator 60. Said relaxation oscillators may be formed by the equivalent elements of SCS, PUT, SUS, SBS, and neon lamp transistor pairs.

Figure 14:
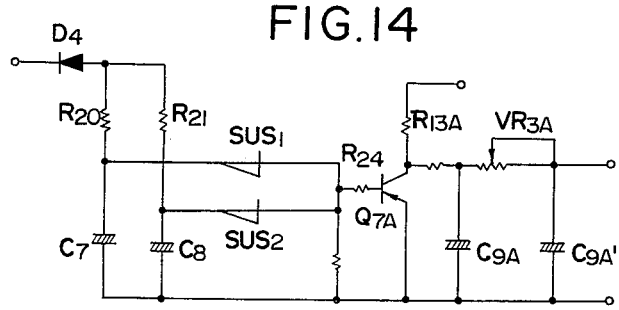
FIG. 14 shows another embodiment of wave generator of the present invention.

Another embodiment of the wave generator 90 is shown in FIG. 14, wherein the same elements are designated with the same numerals, but the corresponding elements are designated with the same numerals followed by letter "A". Similarly, the resultant irregular wave is outputted to control means 50 and trigger pulse generator 60 by transistor $Q_{7A}$, condensers $C_{9A}$, $C_{9A}$, and variable resistor $VR_{3A}$. In this embodiment, the isolation resistors are no longer required. In this case, an output pulse from transistor $Q_{7A}$ is supplied to $R_{13A}$ and $C_{9A}$, and the circuit of $VR_{3A}$ and $C_{9A}$, is used to control the amplitude of the output signal. It will be obvious that any other oscillators or counters may also be substituted for the above.

In order to control various kinds of rotational speeds for the electric fan, the abovementioned resultant wave outputted from said oscillators can be various kinds of wave shapes to thereby obtain a sea wind, spring wind, summer wind, autumn wind and winter wind by providing either a low amplitude, long period wave including an irregular sine wave, or triangular wave, or a high amplitude, short period wave including an irregular sawtooth wave with a short period of duty cycle or by providing multi-wave generators which are operated by a plurality of switches. It is to be understood that the various kinds of natural winds mentioned above may be obtained by using a number of wave generators selected by a plurality of switches.

Furthermore, the control device of the first embodiment, as shown in FIG. 1, will be described with reference to FIG. 9, in which the same element with respect to FIG. 10 is designated with the same numeral.

In this embodiment, the only difference is that the control means 50 is directly connected to power supply 10, further comprising a zener diode $D_1$, through the resistor $R_{25}$, with the other elements being the same as shown in FIG. 10.

I claim:

1. A motor speed control circuit for an electric fan motor to control the speed of operation of the fan motor, said circuit comprising:
   a. a power supply means;
   b. speed control circuit means connected with said power supply means, said speed control circuit means comprising a control means and a delay speed reduction means which includes a charge-discharge circuit, a large capacitor, and a first switch means which is connected between said power supply means and said charge-discharge circuit;
   c. trigger pulse generator means connected with said speed control circuit means and with said power supply means, whereby pulses generated by said trigger pulse generator means are controlled through said speed control circuit means to accomplish variable speed control of said fan motor; d. and output switch means connected with said trigger pulse generator means and with said fan motor, which is in turn connected to an AC source, to receive trigger pulses from said trigger pulse generator means and to supply power to said fan motor, whereby when said first switch means is on, said large capacitor is quickly charged to enable said charge-discharge circuit to charge up to the full range of output signal so that said fan motor performs a normal operation and through the control of said control means the speed control of said normal operation of said fan motor is thus obtained, and when said first switch means is off, said large capacitor is discharged and said fan motor speed is gradually reduced from said normal operation speed to a predetermined relatively low speed.

2. The motor speed control circuit according to claim 1 further comprising a high input impedance means connected between said delay speed reduction means and said control means to provide a further delay of speed reduction for said fan motor.

3. The motor speed control circuit according to claim 36 further comprising wave generator means connected between said power supply means and said control means which produces a predetermined wave output to control the speed of rotation of said motor to obtain a simulation of natural wind conditions.

4. The motor speed control circuit of claim 1, wherein the control means includes a variable resistor.

5. The motor speed control circuit of claim 1, wherein indicating lamp means is connected across the terminals of the fan motor to indicate the speed of the fan motor.

6. The motor speed control ciruit according to claim 2, wherein the high input impedance means comprises a FET.

7. The motor speed control circuit according to claim 1, wherein said output switch means comprises a TRIAC.

8. The motor speed control circuit according to claim 1 wherein said trigger pulse generator means further comprises a resistor connected between said power supply means and said trigger pulse generator means, and a second switch means connected in parallel with said resistor, and when said first switch means is on, the circuit is operable to effect normal operation for said fan motor; and when said first switch means is off and said second switch means is on, said delay speed reduction means of the circuit is gradually operable to reduce the fan motor to a breezy speed operation; and when the first switch means is off and said second switch means is off, said delay speed reduction means of the circuit is gradually operable to reduce the speed of said fan motor to zero.

9. The motor speed control circuit according to claim 1 wherein said delay speed reduction means of said speed control circuit means further comprises a high input impedance means connected to an output terminal of said charge-discharge circuit to provide a further delay of speed reduction for said fan motor.

10. The motor speed control circuit according to claim 8 wherein said delay speed reduction means of said speed control circuit means further comprises a high input impedance means connected to an output terminal of said charge-discharge circuit to provide a further delay of speed reduction for said fan motor.

11. The motor speed control circuit according to claim 1 wherein said speed control circuit means further comprises a delay-reverse means connected to an output of said charge-discharge circuit and with said power supply means, wherein said delay-reverse means includes relay circuit means, and when the rotational speed of said motor reduces to a predetermined speed, said relay selectively operates to control said fan motor by selectively connecting a winding in said motor to provide a reverse rotation.

12. The motor speed control circuit according to claim 8 wherein said speed control circuit means further comprises a delay-reverse means connected to an output of said charge-discharge circuit and with said power supply means, wherein said delay-reverse means includes relay circuit means, and when the rotational speed of said motor reduces to a predetermined speed, said relay selectively operates to control said fan motor by selectively connecting a winding in said motor to provide a reverse rotation.

13. The motor speed control circuit according to claim 1 wherein said speed control circuit means comprises a wave generator means selectively operated through a third switch means connected to said power supply means and said trigger pulse generator means which produces a predetermined wave output to control the speed of rotation of said fan motor to obtain a simulation of natural wind conditions.

14. The motor speed control circuit according to claim 8 wherein said speed control circuit means comprises a wave generator means selectively operated through a third switch means connected to said power supply means and said trigger pulse generator means which produces a predetermined wave output to control the speed of rotation of said fan motor to obtain a simulation of natural wind conditions.

15. The motor speed control circuit according to claim 10 wherein said speed control circuit means comprises a wave generator means selectively operated through a third switch means connected to said power supply means and said trigger pulse generator means which produces a predetermined wave output to control the speed of rotation of said fan motor to obtain a simulation of natural wind conditions.

16. The motor speed control circuit of claim 1 wherein said power supply means further comprises a voltagevariation compensation circuit means connected to an output of said power supply means and operable to prevent variations in line voltage from causing undesired variations in rotational speed of said fan motor.

17. The motor speed control circuit according to claim 9, wherein said high input impedance means comprises one of an FET, MOSFET, SCR, CSCR, PUT, SCS, Darlington's pair transistors, and equivalent means.

18. The motor speed control circuit according to claim 1 further comprising a sudden stop switch means connected in series with the power supply circuit so that the termination of delay speed reduction is selectively obtained.

19. The motor speed control circuit of claim 1, wherein indicating lamp means is connected across the terminals of the fan motor to indicate the speed of the fan motor.

20. A motor speed control circuit for an electric fan comprising:
   a. a power supply means;
   b. speed control circuit means connected with said power supply means, said speed control means including a wave generator means which comprises one of an oscillator and counter;
   c. trigger pulse generator means connected with said speed control circuit means and with said power supply means, whereby pulses generated from said trigger pulse generator means are controlled by said speed control circuit means;
   d. and output switch means connected with said trigger pulse generator means and with said fan motor, which is in turn connected to an AC source, to receive trigger pulses from said trigger pulse generator means and to supply power to said fan motor; whereby
   e. when said wave generator means is energized, it produces a predetermined wave output to said trigger pulse generator means to thereby control the speed of rotation of said fan motor to obtain a simulation of natural wind conditions by fluctuating the speed of said fan motor.

21. The motor speed control circuit according to claim 20 wherein said speed control circuit means further comprises a control means to control the variable speed of said fan motor.

22. The motor speed control circuit according to claim 20 wherein said output switch means comprises one of TRIAC, SCR, SSS, and equivalent means.

23. The motor speed control circuit according to claim 20 wherein the wave generated by said wave generator means is selectively regular or irregular and said wave is generated by one of a PUT, UJT, SCS, SUS, SBS, DIAC, multi-oscillator, extreme low frequency oscillator, and counter.

24. The motor speed control circuit according to claim 21 wherein the wave generated by said wave generator means is selectively regular or irregular and said wave is generated by one of a PUT, UJT, SCS, SUS, SBS, DIAC, multi-oscillator, extreme low frequency oscillator and counter.

25. The motor speed control circuit according to claim 23 wherein said regular wave is generated by one of an oscillator and counter.

26. The motor speed control circuit according to claim 23 wherein said irregular wave is generated by the resultant wave of at least two oscillators.

27. The motor speed control circuit of claim 20, wherein indicating lamp means is connected across the terminals of the fan motor to indicate the speed of the fan motor.

* * * * *